Aug. 25, 1964  J. WALTER  3,145,693
PULVERIZED FUEL FURNACE OF THE VERTICAL AXIS CYCLONE TYPE
Filed May 22, 1962
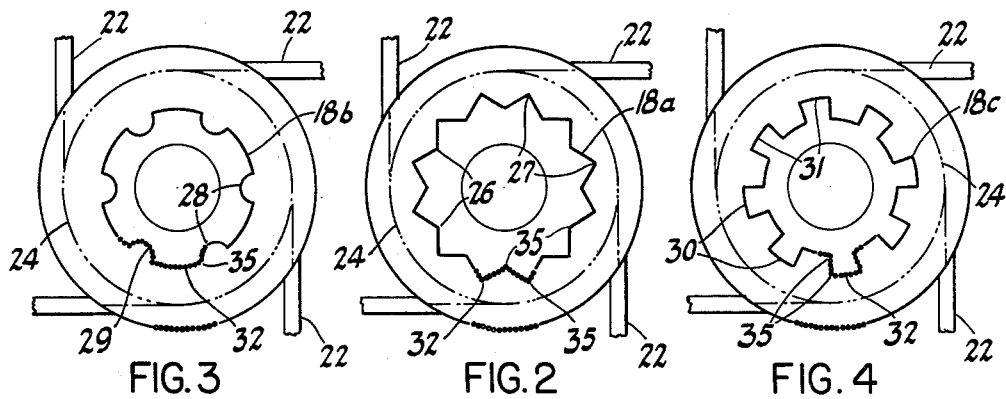
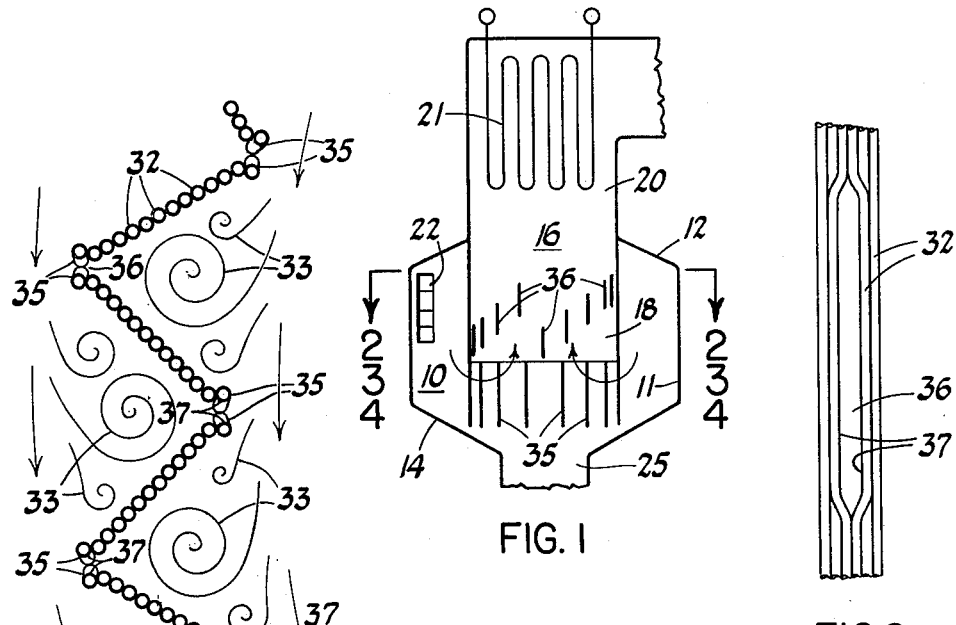
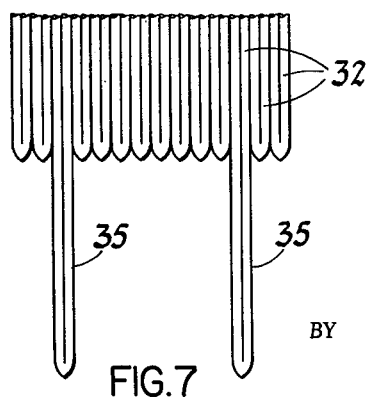
INVENTOR.
JOSEF WALTER
BY
AGENT United States Patent Office 3,145,693
Patented Aug. 25, 1964

3,145,693
PULVERIZED FUEL FURNACE OF THE VERTICAL AXIS CYCLONE TYPE
Josef Walter, Esslingen (Neckar), Germany, assignor to Kohlenscheidungs-Gesellschaft m.b.H., a corporation of Germany
Filed May 22, 1962, Ser. No. 196,660
Claims priority, application Germany June 9, 1961
4 Claims. (Cl. 122—235)

The invention relates to a cyclone type combustion chamber having water cooled walls and being fired with pulverized ash forming fuel. More specifically the invention relates to a cyclone furnace wherein the fuel is being introduced between the furnace wall and an axially immersed gas outlet duct or sleeve. On frequent use of the invention for instance is with steam boilers that are equipped with cyclone type furnaces from which the ash is discharged in a liquid state.

While large quantities of ash are separated from the gases by centrifugal force and are collected in these furnaces, separation of all the ash from the combustion gasses cannot entirely be achieved while the gasses pass through the combustion chamber. Considerable quantities of fly ash composed primarily of smaller ash particles therefore escape with the combustion gases by way of the gas outlet duct. Most of this fly ash may subsequently be captured in an electric precipitator or the like and returned to the combustion chamber where it may be melted down and absorbed by the liquid slag. However, the fly ash entrained in the combustion gases, while still in a liquid or semi-liquid state, tends to collect on the heating surface over which the gases flow after having egressed from the cyclone chamber. Such undesirable slag deposits tend to reduce the heat absorbing capacity of the boiler and accordingly the operating efficiency thereof. It was found that a large percentage of the entrained fly ash particles travel within the outer zone of the gas stream while passing through the gas outlet duct and travel at a higher velocity than the velocity existing in the core of the gas outlet sleeve. Very little time is therefore available for the cooling of these ash particles while they pass through the duct. Accordingly the fly ash particles are still in a liquid or semi-liquid state when sweeping over the heating surfaces located downstream of the gas outlet and readily accumulate on these surfaces in the form of slag.

Considerably more efficient separation of ash from the gases than heretofore achieved, can now be obtained in accordance with the invention by providing the gas outlet duct with prominent projections on the inside of the duct. Thus the boundary layer of the combustion gas stream flowing adjacent the duct wall in a spiral path is by virtue of these projections being induced to form whirls or vortexes rotating about an approximately vertical axis. Centrifugal forces created by these whirls tend to expel entrained ash particles and fling them toward the wall of the gas outlet duct, whereon they form a layer of molten slag which flows toward the slag outlet. The amount of fly ash that is discharged through the duct outlet is thereby considerably reduced. At the same time these vortexes desirably diminish the upwardly directed flow energy of the gas boundary layer.

If, in accordance with the invention, the gas outlet duct wall additionally is being equipped with outwardly directed projections such as between each of two inwardly directed projections, the separation of the fine ash particles within the combustion chamber is still further promoted. Since the stream of burning combustion gas scrubbing the outside wall of the gas outlet duct carries a large quantity of liquid ash or coal particles, these particles are likewise drawn into vortexes created by the outside projections, and in being expelled from these vortexes are thrown against, adhere to and flow down the outside wall of the immersed gas outlet duct. Furthermore, the downwardly and rotationally directed flow velocity of the gases is thereby advantageously diminished. In addition, these whirls or vortexes afford a further more intimate mixing of the pulverized fuel with the combustion air and thereby tend to accelerate the process of combustion.

The above-described form of the gas outlet duct wall can be produced in accordance with the invention in a simple manner by constructing the duct wall so that in a cross section thereof perpendicular to the vertical axis the wall takes the shape of a sinuous or wavelike line.

The rotational flow of the cumbustion gases within the gas outlet duct, in contrast to the upward flow, generally is in the same rotational sense as the rotational flow of the combustion gases in the space between the combustion chamber wall and the gas outlet sleeve. The flow direction of the whirls created by the inner and outer projections maintains a corresponding relationship.

Furthermore, in accordance with the invention slots or elongated openings extending through the duct wall are provided in the crests and troughs of the wave-shaped duct wall to increase turbulence within the troughs. Ash or slag particles that are rotating adjacent and within the sides of the depressions are, due to increased turbulence, being provided with greater opportunity to collide with the sides of these slotted openings, collect thereon and by gravity flow down on the wall surface.

To facilitate the downward flow of the ash particles collected in the depressions of the gas outlet duct, the invention also provides that the tubes forming the trough line or crest line of each wave be extended down to the floor or close to the floor of the combustion chamber, so as to prevent a long free drop of the ash droplets and a remixing thereof with the combustion gases.

It is accordinly a primary object of the invention to reduce the fly ash content of the gases that pass through and leave the central gas outlet sleeve of a cyclone type combustion chamber.

Another object of the invention is to improve to a significant extend the facilities that are provided in a cyclone type combustion chamber for the separation of the liquid or solid ash particles from the combustion gases.

Still another object of the invention is to reduce the accumulation of slag on the heating surfaces over which the gases pass after leaving the cyclone combustion chamber.

A further object of the invention is to facilitate removal of the liquid slag collected on the walls of the gas outlet duct of a cyclonic combustion chamber in a manner which greatly reduces the possibility of reentrainment of the ash droplets by the gas stream.

Other and further objects of the invention will become apparent to those skilled in the art from the detailed description thereof when taken in conjunction with the accompanying drawings wherein:

FIG. 1 is a diagrammatic representation of a cyclone type combustion chamber illustrating the novel features of the invention as applied to the immersed gas outlet sleeve thereof;

FIGS. 2, 3, and 4 are horizontal cross sections when taken on lines 2—2, 3—3, and 4—4 respectively of FIG. 1, showing three specific forms of the wall of the gas outlet sleeve;

FIG. 5 is an enlarged and partial section of the gas outlet sleeve wall shown in FIG. 2;

FIG. 6 is an enlarged and partial elevational view of the portion of the wall of the gas outlet sleeve that is being provided with an enlongated opening; and FIG. 7 is an enlarged and partial elevational view of the lower portion of the gas outlet sleeve shown in FIG. 1.

In FIG. 1 is illustrated in a schematic manner a cyclone type combustion chamber 10 enclosed by an outer wall 11 having a roof portion 12 and a bottom portion 14. A combustion gas outlet duct 16 passes through an opening provided in the roof 12 with an immersed duct portion or sleeve 18 thereof extending downwardly into the combustion chamber 10, and an upper portion 20 thereof leading to exteriorly located heat absorbing surfaces 21. Fuel and air are discharged into the combustion chamber 10 by way of burners 22 generally in a direction tangential to an imaginary firing circle or cylinder 24, see FIG. 3. The fuel is ignited and burned in the annular space between the outer chamber wall and the wall 18 of the immersed gas outlet duct 16 and produces a rotating mass of flaming combustion gases. These gases after following a downwardly directed spiral path are drawn into the central inlet of the gas outlet sleeve 16 as indicated by the arrows, and by continuing in an upwardly directed spiral path are conducted into a radiation chamber containing heat absorbing surfaces 21. Because of the extremely high combustion temperature produced in the chamber 10 the ash entrained in the gases exists in the liquid state. Centrifugal forces produced by the rotation of the gases and the change of direction when the gases enter the sleeve 16 cause a large proportion of the entrained liquid ash droplets to be separated from the gases and to collect on the walls 11 and 14 of the combustion chamber, from whence they flow downwardly under the action of gravity and pass through a slag outlet 25 provided in the bottom wall 14 of the cyclone chamber.

As described hereinabove a large portion of the ash particles remains entrained in the gases and by way of duct 16 is carried to heat absorbing surfaces 21, causing undesirable slag deposits thereon which reduce the heat absorbing capacity of these surfaces.

In order to diminish the amout of ash particles or fly ash entrained in the gases leaving duct 16, the invention provides for a novel configuration of the walls of the gas outlet sleeve 16. This configuration of wall 18 generally takes the form of a wavy, sinuous or serpentine line when viewed in a horizontal cross section. Thus the configuration shown in FIG. 2 represents a sinuous-like curve having alternate projections 26 and depressions 27 when viewed from the inside of the duct. In the configuration shown in FIG. 3 the cylindrically shaped duct wall 18b is provided on the inside with semi-circular projections 28 which when viewed from the outside of the duct take the form of depressions 29. And in FIG. 4 the cylindrical shaped duct 18c is provided on the outside with projections 30 of generally rectangular configuration which when viewed from the inside take the form of depressions 31.

The walls 18, 18a, 18b, 18c are fabricated of interiorly cooled tubes 32 as illustrated in FIG. 6, such as for instance, the evaporating tubes of a steam generator. These tubes advantageously are arranged in parallel spaced relation and preferably are of the return bend or hairpin type.

Border layers of the hot combustion gases rotating around the outside and inside of the immersed gas outlet sleeve 16 form whirls or vortexes in the depressions of the wall surface, as indicated in FIGS. 2, 3, 4, and 6. Centrifugal forces released by the rotation of the ash carrying gases within these whirls cause the liquid ash or slag particles to be thrown against the sides of the depressions, where the slag collects and runs down the sides of the duct wall toward the slag outlet 25. In addition these gas whirls cause intermixing of unconfined fuel particles with the combustion air, thereby accelerating the process of combustion.

In order to prevent ash droplets from again being picked up from the gas stream as they drop off the lower edge of the gas outlet sleeve 16, the invention provides that tubes 35 forming the crest lines or trough lines of the wave-shaped wall surface be extended downwardly toward the bottom 14 of furnace chamber 10. This will provide a surface for the liquid ash to cling to and to run down thereon. In this manner ash particles collected on the duct wall surfaces are conducted close to or all the way to the floor of the combustion chamber, and escape reentrainment thereof into the combustion gas stream as these gases turn the corner into the gas outlet duct 16.

To further encourage and facilitate collection of the fly ash particles or droplets according to the invention as earlier described herein in detail slots or elongated openings 36 are provided in the duct wall as shown in FIGS. 1, 5, and 6, with the edges 37 of these slots serving to further encourage separation of the fly ash from the gases. Experience has shown that turbulence and facility of expelling ash particles are increased and maintained by permitting free passage and interchange of gases through these restricted openings in the wall between the inside of the gas duct and the outside thereof.

From the above it can readily be appreciated that my inventive improvements accomplish several most desirable results in the operation of a cyclone type combustion chamber.

The invention reduces to a considerable extent the amount of fly ash carried out of the chamber with the gases and accordingly the slag deposits on the auxiliary heating surfaces.

The invention encourages a more speedy and more complete combustion by creating turbulence within the boundary layer of the gas stream passing through the cyclone chamber and gas outlet duct.

The invention causes a greater percentage of the total ash content to be separated from the gases in the combustion chamber and removal thereof by way of the slag outlet thereby reducing the cost of auxiliary fly ash precipitating and recycling equipment.

I claim:

1. A pulverized fuel furnace having a vertical cyclone type combustion chamber including a top gas outlet duct axially immersed in said cyclone type chamber with the walls of said duct being spaced from the walls of said chamber and comprising internally cooled tubes in side-by-side relation; means for tangentially discharging fuel and air into the space between said duct and the wall of said combustion chamber for burning said fuel in said chamber and for producing a rotating stream of combustion gases; the wall of said gas outlet duct having a lower edge defining an axial opening for receiving said rotating stream of gases; said duct wall comprising a wave-like surface provided on the inside thereof with alternate ridges and valleys generally extending in an axial direction and uniformly distributed over the periphery of said duct wall; means forming in the bottom of said valleys restricted openings surrounded by duct wall portions; said openings extending through said wall, being longitudinally elongated and of such size as to permit only a minor flow of gases therethrough.

2. A pulverized fuel furnace as defined in claim 1 wherein the tubes forming the bottom of the valleys are extended downwardly toward the bottom of the combustion chamber.

3. A pulverized fuel furnace having a vertical cyclone type combustion chamber including a top gas outlet duct axially immersed in said cyclone type chamber with the walls of said duct being spaced from the walls of said chamber and comprising internally cooled tubes in side-by-side relation; means for tangentially discharging fuel and air into the space between said duct and the wall of said combustion chamber for burning said fuel in said chamber and for producing a rotating stream of combustion gases; the wall of said gas outlet duct having a lower edge defining an axial opening for receiving said rotating stream of gases; said duct wall being provided on the inside thereof with alternate ridges and valleys generally extending in an axial direction and uniformly distributed over the circumference of said duct wall; said duct wall additionally being provided with ridges and valleys on the outside thereof which ridges and valleys complement the valleys and ridges respectively provided on the inside of said duct wall; means forming in the bottom of the valleys or tops of the ridges respectively, restricted openings surrounded by duct wall portions, said openings extending through said wall, being longitudinally elongated and of such size as to permit only a minor flow of gases therethrough.

4. A pulverized fuel furnace as defined in claim 3 wherein the tubes forming the bottom of the valleys or the tops of the ridges respectively are extended downwardly toward the bottom of the combustion chamber.

References Cited in the file of this patent

FOREIGN PATENTS

| | | |
|---|---|---|
| 1,111,182 | France | Oct. 26, 1955 |
| 1,131,616 | France | Oct. 22, 1956 |
| 920,203 | Germany | Nov. 15, 1954 |